April 14, 1925.
H. H. STEELE
1,533,671
MACHINE TO TEST THE TEETH OF SPUR GEARS
Filed Aug. 19, 1921
3 Sheets-Sheet 3
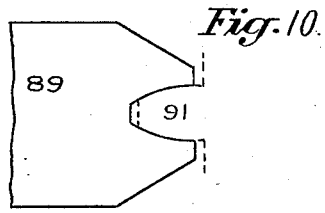
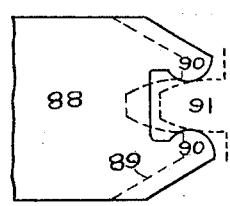
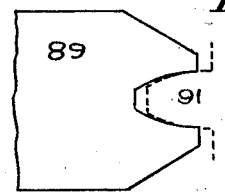
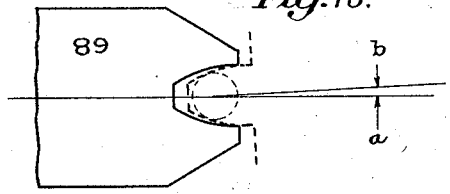
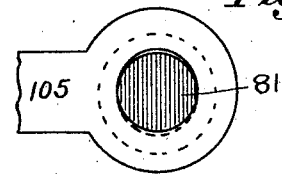
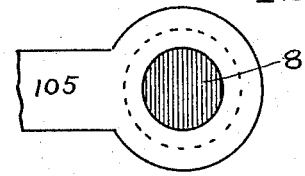
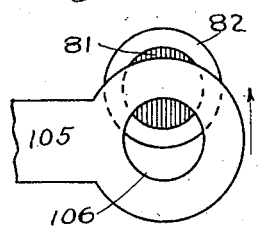
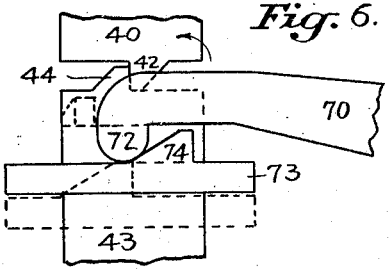
INVENTOR.
Herbert H. Steele Patented Apr. 14, 1925.

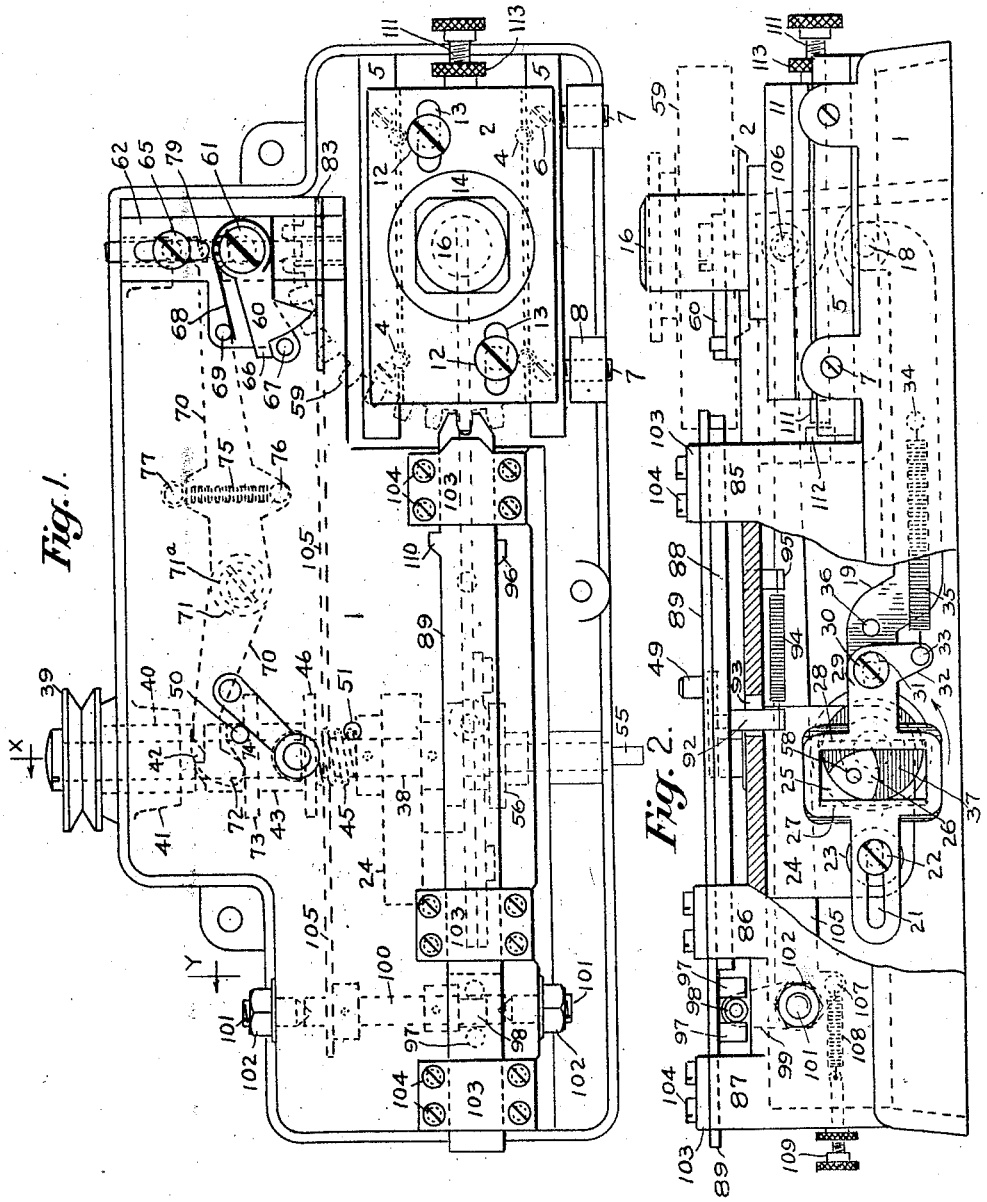

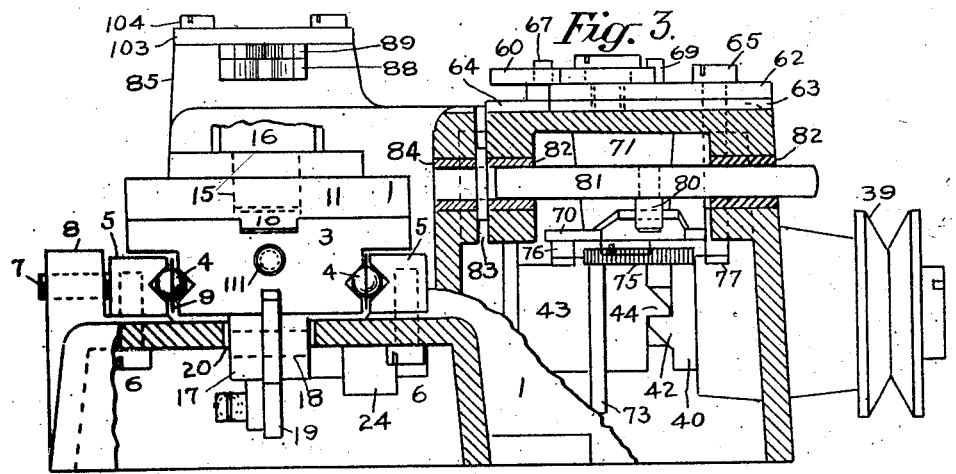
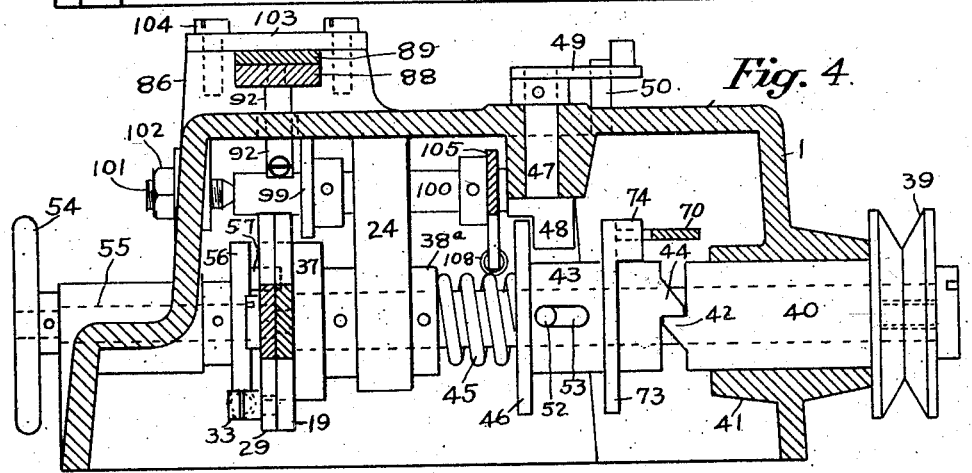
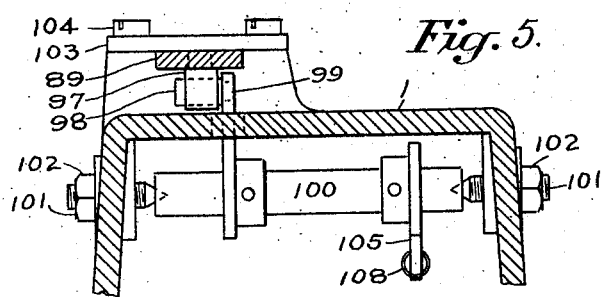

1,533,671

UNITED STATES PATENT OFFICE.

HERBERT H. STEELE, OF SYRACUSE, NEW YORK.

MACHINE TO TEST THE TEETH OF SPUR GEARS.

Application filed August 19, 1921. Serial No. 493,693.

*To all whom it may concern:*

Be it known that I, HERBERT H. STEELE, a citizen of the United States, residing at Syracuse, in the county of Onondaga and State of New York, have invented a new and useful Improvement in Machines to Test the Teeth of Spur Gears, of which the following is a specification.

My invention relates to that class of machines employed to test the accuracy of the teeth of spur gears relative to eccentricity, profile of tooth and pressure angle, that may develop during the process of manufacture.

In the early days of gear making, the gear blank was machined, cut and finished before it was removed from the arbor or centering element. The gear-makers in those days experienced no trouble due to eccentricity or variations in the profile and involute angle, because the gear and its arbor were transferred from one machine to another as a unit.

The development of the automobile with its train of shifting gear transmissions, brought about drastic changes in the gear making art, primarily to reduce the cost of production. Today the gear-blank is bored and faced on an "automatic"; the teeth are generated from a hob and finished in a gear shaper; the gear is hardened and passes through a series of grinding operations to true-up the bore, the rim and face and the involute curve of the tooth. In some of these operations, the gear is centered on an arbor through the bore; in others, the gear is centered from the rim in a chuck and every change in these centering mediums promote eccentricities and variations in the tooth-form that must be compensated for by a tolerance in limits that indicate slack or backlash, that should not exist in a noiseless translation of power, which is the dream of every manufacturer of automobile transmissions.

Various manual devices are in use to detect some of these defects in the gear teeth before assembly, but the fact that they are manually operated, such as rotating the gear under a test gauge for eccentricity, or employing the wire system which consists of dropping a wire section between the teeth and rotating under a test gauge, allows too much latitude to the judgment and eyesight of the inspector; and these tests are of little value for a fine uniform inspection of each tooth, and hence One object of the present invention is to provide a power-driven machine that will be uniformly consistent and not only test the gear as a whole for eccentricity between the bore and pitch circle, but will simultaneously test each individual tooth for thickness at the pitch line, the involute curve of the face and the pressure angle of the tooth.

Another object, is to provide a machine that will be automatic in its operation and register a perfect tooth by advancing the next consecutive tooth for a test and register an imperfect tooth by stopping the machine.

Another object, is to design a simple, inexpensive machine that may be set permanently for a single style of gear and be duplicated for other styles of gears; rather than a complicated machine that may be adjusted for a great many styles of gears and require an expert to set it up for the operator.

With the above and other objects in view, this invention consists in the combination, construction and arrangement of parts as will be hereinafter more fully described and which are illustrated in the accompanying drawings, in which—

Figure 1, is a plan view of the entire machine, constructed and arranged according to my invention; a portion of a spur gear being shown in operative position, in dotted lines.

Figure 2, is a side elevation of Figure 1, with a central portion of the frame removed.

Figure 3, an enlarged end elevation with portions of the frame broken away.

Figure 4, a vertical cross section approximately on a plane indicated by the line X, Figure 1.

Figure 5, a similar section on the line Y, Figure 1.

Figure 6, an enlarged two positional view of the clutch.

Figures 7, 8 and 9, are views of the clutch controlling elements.

Figure 10, shows the master tooth template and a gear tooth.

Figure 11, shows the tooth centering element and

Figures 12 and 13 illustrate the effect of imperfect gear teeth on the master form or template.

In the several views, where similar figures of reference indicate similar parts, 1 indicates the frame of the machine adapted to enclose or support the several mechanisms to form a complete unit. The frame is formed with a depressed section to receive a carriage or carrier indicated as a whole as 2. The carriage comprises a rectangular block section 3 formed with parallel V-ways on both sides thereof to receive anti-friction balls 4 that co-operate with similar ways in two rails 5 secured to the frame by screws 6; one of these rails may be rendered adjustable in a direction towards the opposite rail, by screws 7 threaded through suitable ears 8 rising from the frame 1. This construction provides for a free easy running carriage; a carrier that will not deviate from a fixed plane determined by the rails. To prevent the balls 4 from creeping away from their proper position, a ball separator 9 of well known form, is indicated by a solid black line. The upper face of the block 3 is formed with a longitudinal groove to receive a spline 10 formed on the under face of a second block 11 that is similar to the block 3 in outline and may be rendered adjustable to the latter in the direction of its motion, by screws 12 passing through slots 13 in the section 11 and threaded into the section 3. The section 11 is formed with a boss 14 that has a central hole for a bearing for the reduced end 15 of a post 16 that rises vertically from the carrier and adapted to rotate freely therein. This post 16, is shown to have a square cross-section because it is to enter the square hole in a sliding gear for an automobile transmisson. For a gear having a round hole, the said post would be replaced by one having a round cross-section. The underside of the carriage block 3, is formed with a lug 17 that is slotted centrally and provided with a cross-pin 18 to receive the end of a drawbar 19 that controls the to and fro movement of the carriage as a unit. This drawbar 19 passes down through a slot 20 in the frame and thence horizontally within the frame where the exereme end is slotted as at 21, to receive the shouldered screw 22 that is threaded into a post 23 forming part of a downwardly extending lug or ear 24 cast integral with the frame. The drawbar 19 is formed with a rectangular opening 25 adapted to co-operate with a triangular cam 26 arranged to transmit a stop motion control to the said bar, which is a well known form of transmission with this exception; were the cam 26 to bear direct against the two perpendicular walls of the opening 25, the movement of the drawbar 19 would be fixed and positive and the movement of the carriage 2 would always be uniformly the same and the adjustment of the two carriage sections 3 and 11 would develop a painstaking operation, as will presently be understood. To overcome this difficult adjustment of the carriage movement to other essential parts presently to be described, the opening 25 in the drawbar 19 is made wider than the scope of the cam 26; the perpendicular wall 27 of the said opening never comes into contact with the cam 26; but the wall 28 is normal and engages with the cam on the return stroke. To render the cam 26 effective on the forward stroke, a shuttle section 29 having the same general outline as the adjacent bar 19 and with a slot similar to 21, is hung upon the side of the bar 19 and retained by the two screws 22 and 30 but has a limited longitudinal movement independently of the said bar, within the confines of the slot 31 in the said shuttle 29. The rectangular opening in this piece 29 has a width equal to the radius of the face of the cam 26 and hence has a positive movement relative to the said cam. The piece 29 is formed with an ear 32 to receive a spring stud 33. A similar stud 34 is secured to the drawbar 19 and a spring 35 connected to both studs. From this description, it will be seen that when the cam 26 has rotated one-half a revolution from the position shown in Figure 2, the spring 35 will draw the shuttle 29 to a stop position against the pin 36 and the vertical wall 28 will assume a position to aline with the adjacent wall of the opening in the shuttle 29 and the two walls will contact with the face of the cam 26 as a single unit on the return stroke of the drawbar 19. That when the drawbar 19 is moved on the forward stroke, or towards the left hand of Figure 2, the engagement of the shuttle 29 with the cam, will move the carriage, because the spring 35 has sufficient strength to overcome the resistance of the carriage; but if for purposes presently to appear, the carriage should be checked before the cam 26 has completed its stroke, the drawbar 19 will become stationary with the carriage and the surplus movement from the cam will be absorbed by the spring 35, and the shuttle will move in advance of the bar 19, as shown in Figure 2, where the cam has completed its effective movement and is about to enter upon the dwell at the radial face which locks the carriage in a fixed position during this interval of inactivity.

The cam 26, is formed integral with a disk 37 that is secured to the end of a horizontally arranged shaft 38. This shaft 38 takes a bearing in the lug 24 and thence extends across the frame 1 to pass through the opposite wall thereof where the free outer end is provided with a driving wheel 39. The wheel 39 is formed with a sleeve 40 that takes a bearing within the boss 41 of the frame; the free inner end of this sleeve is formed with a single tooth 42. A sleeve 43 is mounted upon the shaft 38 and formed with a slot 53 to engage with a pin 52 driven into the shaft; this permits the said sleeve to have a limited movement along the shaft but must rotate in unison with the shaft. This sleeve 43 is formed with a single tooth 44 in opposite relation to the tooth 42 and form clutching elements between the said wheel 39 and the shaft 38. To maintain the two teeth 42 and 44 in clutching engagement, a spiral spring 45 is introduced around the shaft 38 under tension between the sleeve 43 and a collar 38ª that is fixed to the said shaft to bear against the face of the lug 24 to prevent end motion of the said shaft. The sleeve 43 is formed with a flange 46 and adjacent to this flange, as best shown at Figure 4, a short shaft 47 has a vertical bearing through the top of the frame and formed with a head 48 that is flattened on the side adjacent to the said flange 46. The upper end of the shaft 47 projects above the frame where the free end is provided with a finger piece 49 adapted to a swinging motion between the two stop pins 50 and 51. The swinging of the finger piece 49 to rotate the shaft 47 will cause the corners of the flattened head 48 to cam against the flange 46 and force it against the tension of the spring 45 and withdraw the tooth 44 outside the rotary field of the driving tooth 42, thus disengaging the clutch by a manual operation.

54 is a finger wheel secured to the end of a shaft 55 that is positioned to aline with the shaft 38. This shaft 55 takes a bearing through the frame and the inner end is provided with disk 56 having a short stud 57 set in the face thereof and at right angles thereto that is positioned to aline with and enter a hole 58 in the face of the cam 26. This finger wheel provided a manual control over the shaft 38, for purposes presently to appear.

Referring to Figure 1, a section of a gear 59 is shown in dotted lines, so as not to obscure other parts, with the post 16 for an axis. A pawl 60 is secured by a screw 61 to a slide 62 that is formed with a tongue 63 to enter a groove 64 in the top of the frame. This slide 62 is adjustable relative to the axis of the gear 59 and may be secured in an adjusted position by the screw 65 that threads into the frame. The pawl 60 has a projection 66 adapted to strike a stop pin 67 to limit the reaction from the spring 68 that is wound around the hub of the pawl with its free end bearing against the pin 69 driven into the slide 62. This pawl 60 is positioned and adapted to engage with the teeth of the gear 59 in such a manner, that on the forward stroke or movement of the carrier 2, the said pawl snaps over the adjacent tooth and at the end of the movement of the carrier, the pawl will assume a position shown in Figure 1; on the return stroke of the carriage, the pawl being stationary, will cause the gear 59 to rotate about its axis; the movement thereof being sufficient to advance the gear one tooth distance.

70, is a horizontally disposed lever that is hung from the face of a boss 71 by a screw 71ª. This lever at one end is formed with a round nose 72 positioned to bear against the face of a flange 73 forming part of the sleeve 43; this nose 72 is operated on by a cam face 74 forming part of the said flange 73, to impart a vibratory movement to the said lever 70 in one direction. The said lever is vibrated in the opposite direction by a spring 75 secured at one end to a stud 76 on the lever and the other end to a fixed stud 77 in the frame. To check the reaction from the said spring beyond what is required to operate the lever 70, the said lever is formed with an arm 78 to strike the stationary stud 77. The opposite end of the lever 70 is forked as at 79 to receive a stud 80 dropping from a sliding bolt 81. The bolt 81 is round in cross section and slides within suitable bushings 82 driven within holes in the frame. As shown at Figure 3, the left hand bushing is divided just beyond the end of the bolt 81 as by making a saw cut through frame and bushing to provide a cross slot 83 that may be traversed by the end of the bolt 81 to enter the hole in the bushing 84 at each vibration of the lever 70. The outer end of this bolt 81 projects beyond the frame so as to enable the operator to push the bolt inwardly with the finger when required.

The frame 1, is formed with three upright lugs 85, 86 and 87, each formed with alining channels to provide bearings for two slide bars 88 and 89. The bar 88 is thicker than the bar 89 and only has bearings in the two lugs 85 and 86, and terminates at one end outside the lug 85 with a tooth-centering form as shown enlarged at Figure 11, where two oppositely disposed rounded faces 90 are adapted to embrace a tooth 91 on both sides and at the pitch line thereof. This bar 88 has a spring stud 92 on the underside that drops through a hole 93 in the top of the frame and the end is connected by a spring 94 to a fixed stud 95 in the frame. The reaction from this spring forces the bar 88 to the right of Figure 2 until the ear 96 engages with the face of the lug 85.

The sliding bar 89, takes a bearing within all three lugs 85, 86 and 87, and like the bar 88, extends beyond the lug 85 with its free end formed with a notch conforming to the profile of a perfect gear tooth as shown at Figure 10. Between the two lugs 86 and 87, the bar 89 is provided on the underside, with two studs 97 adapted to embrace a roller 98 mounted upon a stud secured to the end of a crank arm 99 that rises through a hole in the frame from a rock shaft 100 positioned underneath at right angles to the bar. This rock shaft 100 may be hung from mitre-pointed screws 101 that are threaded through the adjacent walls of the frame and provided with check nuts 102. The two bars 88 and 89 are retained in their bearings or channels, by suitable cap pieces 103 that may be secured to the face of the lugs by screws 104. These bars 88 and 89 are adjusted for a close running fit within their bearings and the connection between the bar 89 and the rock shaft 100 at the studs 97 and roller 98 is free from any loss of motion.

105 is a long lever secured to the rock-shaft 100 and extends nearly the full length of the machine where the free end terminates at an eye 106, positioned to enter the slot 83 and aline with the hole in the bushing 84 and with the sliding bolt 81. The lever 105 adjacent the rock shaft 100, may be provided with a spring stud 107 adapted for a spring 108 that may be regulated by a suitable take-up screw 109 through the frame. The object of the spring 108, being to counterbalance the overhanging end of the lever 105 and also to restore the bar 89 to normal position; the stop 110 on the said bar 89 serves to arrest the reaction from the said spring, by striking the adjacent face of the lug 85.

From this description, it will be seen that the bar 88 has a longitudinal movement that is limited by the stop 96 in one direction and the wall of the hole 93 in the opposite direction. That the bar 89 has a longitudinal movement that is limited by its stop 110 in one direction and by the free end of the lever 105 striking the top of the frame in the opposite direction. That the movement of the bar 89 will cause the eye 106 in the end of the lever 105 to swing radially through the position of the bolt 81. That the movement of the said bar 89 will be greatly multiplied at the position of the eye 106 due to the difference in leverage between the length of the crank arm 99 and the length of the lever 105; this difference as shown, is approximately one to twelve.

The operation of the machine as now described is as follows—

It being assumed that the carrier 2 is at its normal position or at the end of the return movement, the finger piece 49 is shifted against the stop pin 51 to open up the clutching elements 42 and 44; the finger wheel 54 is now turned in the direction of the arrow in Figure 2, which rotates the shaft 55 and through the pin 57 that engages the hole 58 in the cam 26, the shaft 38 will rotate in unison with the finger wheel and cause the cam 26 to operate the drawbar 19 and draw the carriage forward to the position shown in Figure 2. This position can be felt by the fingers because the cam 26 has assumed a position that locks the drawbar 19 against the reaction from the spring 35. The two screws 12 on the carrier are now loosened to permit the block 11 to move independently of the base 3 and the gear to be tested, is adjusted to the carrier by dropping it over the square post 16; the gear is now pushed forward by the hand so that one tooth will engage with both forms on the ends of the two bars 88 and 89 and cause the bar 89 to vibrate the rock-shaft 100 and the lever 105 to swing the eye 106 to the position of the bolt 81. While the carriage is thus moved by one hand, the protruding end of the said bolt 81 is pushed inwardly by the finger and if the adjustments are correct, the said bolt will enter the eye 106; if the bolt does not enter but strikes the edge, the carrier 2 is shifted slightly forward or back until the said bolt 81 finds the eye 106 and enters. This shows a correct adjustment of the carrier and the two screws 12 are now set to permanently lock the two carriage sections together as a single unit. The stop screw 111, is now turned to bring the end thereof into contact with the stop stud 112 in the frame; the said stop screw 111 being threaded through the block 3 will check the forward movement of the block and may be locked in position by the check nut 113. While the gear is still in this position, the slide 62 is shifted so that the pawl 60 will drop back of an adjoining tooth of the gear and the screw 65 is then set to lock the slide to the frame. The finger wheel 54 is now rotated in the same direction to complete the rotation and throw the carriage or carrier back to its normal position.

It being assumed that a constantly running belt is driving the pulley 39, the said pulley will rotate within the bearings of the frame and around the stationary shaft 38. When the finger piece 49 is shifted against the stop pin 50, the spring 45 will force the sleeve 43 along the shaft 38 and cause the tooth thereon to enter the rotary field of the tooth 42 formed integral with the driving pulley; the said tooth 42 will pick up the tooth 44 and cause the said sleeve and shaft 38 to rotate in unison. The rotation of the shaft 38 will rotate the triangular cam 26 and through the engagement thereof within the openings 25 in the two-part drawbar 19 and 29, the said drawbar will draw the gear carrier 2 forward; the tooth of the gear 59 that lays in an axial plane to the two bars 88 and 89 will first contact with the forms 90 on the end of the bar 88; these rounded faces will rotate the gear to bring the tooth into an axial position; or in other words, it centers the tooth by engaging it on either side at the pitch circle, relative to an axial line that passes through the center of the said slide 88 and through the center of the post 16. This movement of the carrier 2 continues; the bar 88 will be moved to the left of Figures 1 and 2 and against the reaction of the spring 94; until the tooth already centered, is brought into contact with the end of the bar 89 that carries a true profile of a gear tooth and constitutes a master form or template; the movement of the carrier after the engaging tooth of the gear has been brought into contact with the master profile on the end of the bar 89 is very short; just enough to actually move the bar and raise the eye 106 into alinement with the bolt 81 and a little more. When this movement has been accomplished, the cam 26 has reached the end of its operative stroke as shown in Figure 2, and a further movement of the shaft 38 and said cam 26 through an arc of about 60 degrees, will have no effect on the carrier except to hold it in an operative position relative to the ends of the two bars 88 and 89 carrying the gauging forms. During this interval that the carriage is stationary, the cam 74 is timed to engage with the nose 72 of the lever 70, to vibrate the latter and cause the forked end thereof to shift the bolt 81 through the stud 80. If the adjustment of the parts are accurate, the said bolt will pass through the eye 106; the said eye having been moved from the position of Figure 7 to that of Figure 8. Should the adjustment of the carrier not be correct, the eye 106 may assume the position shown at Figure 9, where the eye 106 is a little below the plane of the bolt 81 and hence the said bolt cannot enter the eye, but the movement of the bolt will be arrested by the end thereof striking the face of the lever 105. When this condition appears, the lever 70 being unable to complete the movement defined by the cam 74; the nose 72 being held stationary by the action of the bolt 81, the said nose 72 becomes a caming element and will cause the cam 74 to ride over the stationary face of the nose and shift the position of the sleeve 43 on the shaft until the tooth 44 thereon is withdrawn from the field of the tooth 42 which instantly stops the rotation of the shaft 38; the nose 72 engaging a flat face of the cam 74 as shown in dotted lines in Figure 6. The machine not having been properly adjusted up to this point, the screw stop 111 is readjusted until the said bolt 81 alines with the eye 106 and which readjustment will, through the action of the spring 75 permit the said bolt 81 to pass through the eye 106 and simultaneously the spring 45 will restore the sleeve 43 and the tooth 44 into engagement with the tooth 42. The nose 72 in the meantime has dropped over the edge of the cam 74 and assumed its normal position against the face of the flange 73 and the bolt 81 has been withdrawn from the eye 106. This movement of the lever 70 and to and fro movement of the bolt 81 is completed before the cam 26 becomes operative to restore the carrier to its normal position. When the cam 26 has passed that portion of its cycle that renders the carrier 2 inactive, the said cam will engage with the walls 28 of both bar 19 and shuttle 29, if they are in alinement, and the carriage will enter upon the return stroke; the pawl 60 engaging with a tooth of the gear 59 will cause the said gear and post 16 to rotate a dimension equal to the distance between two adjoining teeth and thus bring up a new tooth to the operative position. The cam 26 providing for a stop-movement at the end of its cycle which permits ample time to stop the machine by shifting the finger piece 49 when the gear 59 has passed through a complete rotation and is to be removed and another gear substituted. The forward movement of the carrier to test the new tooth will be through the action of the cam 26 against the vertical wall of the opening 25 in the shuttle 29; the shuttle drawing the bar 19 through the spring 35. If the stop 111 strikes the stud 112 and the carriage movement is arrested before the cam 26 reaches the end of its stroke the bar 19 also becomes stationary and the further movement of the cam 26 will cause the shuttle piece 29 to move independently of the bar 19; this condition will be caused by the adjustment of the carriage stop 111 after the two carriage parts 3 and 11 have been permanently fixed in the trial adjustment; and were it not for this arrangement of a two-part drawbar 19, it would be a difficult matter to adjust the carriage movement to the action of the bolt 81 through the screws 12 alone, because the variation of a few thousandths of an inch in the stop position of the carrier will be greatly multiplied at the eye 106; but with the fine threads on the stop 111, for a final adjustment of the parts and with a take-up mechanism similar to the shuttle 29 to absorb any surplus movement from the cam, the adjustment of the machine can be set for a very fine contact between the active tooth of the gear and the associated members that are to test its profile.

From this description of the operation, it will be seen that if the gear tooth is correct, it will so engage the master tooth form on the end of the bar 89 that the said bar will bring the eye 106 into perfect alinement with the bolt 81, but if a tooth in the gear should be a little thick at the pitch circle from any manufacturing cause, the engagement of this thick tooth with the master tooth profile will cause the two parts to look like Figure 12 and the movement of the gear carrier always being uniform, it is obvious that the said tooth will push the bar 89 a little further than normal and cause the eye 106 to rise above the plane of the bolt 81 as shown at Figure 9 and hence the bolt cannot enter the eye and the machine will be automatically stopped with the incorrect tooth in operative position. In such an instance, the operator shifts the finger piece 49 against the pin 51, to lock the sleeve 43 in inoperative position; he then marks the tooth with a piece of chalk, turns the finger wheel 54 to restore the carrier and bring forward a new tooth and then restores the finger piece 49 against the pin 50, to continue the operation. Similarly, if a tooth in the gear is not up to the required thickness at the pitch line, the said tooth when brought into contact with the master tooth form, will not shift the bar 89 quite far enough to bring the eye 106 into co-operation with the bolt 81 and the machine will be stopped at the incorrect tooth position. These are the two conditions that will appear when the eccentricities exist between the bore and the pitch circle; and while the tooth profile may be correct and the tooth may aline perfectly with the master tooth form as shown at Figure 10, the fact that the distance varies from the axis of the gear will produce just the same results as a thick or a narrow tooth, to wit; the short radius will not move the bar 89 the required distance and the long radius will move the bar too far; and if his variation amounts to only one-half a thousandth of an inch, this dimension will be multiplied by the long lever 105 to be approximately six thousandths of an inch that the eye 106 will be out of alinement with the bolt 81 which is more than sufficient to catch the edge of the said bolt and stop its motion.

These shift gears in a transmission, are always hardened and during the hardening operation, some of the teeth become slightly warped or sprung out of their true radial position. When such a gear is adjusted to an arbor and placed in the grinder to grind the involute face of the teeth, the operator is required to favor the gear and not hold strictly to pressure angles. He is allowed ten-thousandths of an inch for trueing up the tooth form and when the tooth passes between the two grinding wheels, he adjusts the plane of the arbor so that equal quantities will be ground from each side of the tooth, with the result in a very much warped tooth, the arbor is shifted an abnormal distance to save the gear and the actual angle of the tooth that is generated by the grinders, not only destroys the correct pressure angle for the tooth, but the angle of the tooth assumes that shown exaggerated at Figure 13, where $a$ indicates the true axis for the tooth and $b$ the axis made by the grinding operation to save a gear from the scrap pile. This tooth to all outward appearances may look correct, but when assembled to mesh with other gears in the transmission, develops a noisy transmission and the problem is to detect this tooth before it enters the assembly stage. As shown at Figure 13, this tooth may have the proper thickness at the pitch circle and may be a perfect tooth except for its angle; and when this tooth is brought into contact with the faces 90 of the bar 88, the tooth will be centered in alinement with the line $a$ and when brought into contact with the master tooth profile in the bar 89, it will engage therewith as shown in this figure with the result that the said bar will be pushed too far, and the eye 106 will rise above the plane of the bolt 81.

In practice, this machine can be strung up so fine that it will be an impossibility to manufacture a gear so perfectly that it will pass the test of the master tooth profile and it will be necessary to allow a tolerance to cover slight imperfections. This can readily be accomplished by enlarging the eye 106 a few thousandths of an inch more than the diameter of the bolt 81.

From this description of the machine and its operation, it will be seen that the gear is placed on a gear carrier or carriage and drawn into and out of contact with a master tooth profile; that each tooth is tested individually; that each tooth tested, operates to coact with a master form of tooth in such a manner as to register its own profile by advancing the next tooth, if its profile is correct, and by stopping the machine at the tooth, if the profile has an error; that the carriage or gear carrier has a to and fro movement with an idle dwell at each end of its movement; that means are provided to greatly magnify a slight error in the tooth so as to make it mechanically possible to register that error; that the machine is automatic in its action and uniformly consistent with the limits set for a predetermined tolerance for tooth error; that the only manual operation consists of adjusting and removing a gear from the carrier and hence one operator can attend to several machines; that the carriage is adapted to varying diameters of gears and to gears having different forms of bore; that while a tooth having the involute form of face has been described and shown, this form may be readily changed to another form of gear tooth by substituting another bar having the new profile formed in the end thereof; and that the tooth of the gear is first centered relative to an axial line and held in this position during the interval that the master tooth profile is active to register the shape, size and angle of the tooth.

Having thus described the nature of this invention, it will be understood that it is not limited to the precise forms shown, but may be varied in any manner to better carry out the principle of the invention without departing from the true scope thereof.

What is claimed and desired to be secured by Letters Patent is—

1. In a machine to test a gear tooth, the combination with a movable member provided with a notch conforming to a master tooth profile, of a power driven carrier having a to and fro movement to bring a tooth into co-operation with the movable member and devices controlled by the movable member for stopping the carrier through any error in the form of the tooth.

2. In a machine to test a gear tooth, the combination with a power driven gear carrier, of a movable member having a notch conforming to a tooth profile and means co-operative with the member as positioned by the tooth being tested, to control the movement of the carrier.

3. In a machine to test a gear tooth, the combination with a frame, of two members mounted on the frame for a reciprocating movement, one member carrying a gear to be tested and the other member carrying a gauge and means for automatically and successively bringing both members into joint co-operation to gauge separately each tooth of the gear.

4. In a machine to test a gear tooth, the combination with a frame, of two members mounted for reciprocatory movement in the frame, one member to carry a gear and the other member to carry a gauge and means for automatically bringing both members in joint cooperation to gauge a tooth profile with a predetermined degree of tolerance.

5. In a machine to test gear teeth, the combination with a power driven reciprocating gear carrier, of a master tooth form adapted to engage with a gear tooth at each reciprocation of the carrier and means co-operative with the said master form to register an error in a tooth's profile by stopping the movement of the carrier.

6. In a machine to test gear teeth, the combination with a power driven reciprocating gear carrier, a master tooth form adapted to engage with a tooth at each reciprocation of the carrier and means co-operative with the said master form to register a correct tooth by advancing the next succeeding tooth.

7. In a machine to test gear teeth, the combination with a power driven reciprocating gear carrier, of a gauge comprising a correct tooth form to test each tooth of the gear, means to bring the gauge and gear into co-operation and means controlled by the gauge to automatically advance the gear one tooth distance at each reciprocation of the carrier.

8. In a machine to test gear teeth, the combination with a power driven carrier for a gear to be tested, a master tooth form to engage with each individual tooth of the gear and means cooperative with the said master form to stop the carrier when the tooth engaged by the form is defective.

9. In a machine to test gear teeth, the combination with a power driven carrier adapted to hold a gear for a rotary step by step feed, means for effecting said feed, a master tooth form to engage with each tooth of the gear and means cooperative with the said master form to stop the carrier when a defective tooth engages said form.

10. In a machine to test gear teeth, the combination with a power-driven carrier constructed to have a gear mounted on the carrier for a rotary movement, of means comprising a pawl to impart a step by step feed to the gear, a master tooth form brought into contact with each tooth of the gear and means co-operative with the said master form to stop the carrier to indicate a defective gear.

11. In a machine to test gear teeth, the combination with a power driven reciprocating carrier constructed to support a gear for a rotary movement, of a step by step feeding mechanism for the gear, a master tooth form adapted to engage with each tooth and means co-operative with the master form to stop the carrier when a defective portion of the gear is engaged with the master form.

12. In a machine to test gear teeth, the combination with a power driven reciprocating carrier for a gear to be tested of a master tooth form to engage with each tooth of the gear and means co-operative with the said master form to indicate any error in the profile of the tooth.

13. In a machine to test gear teeth, the combination with a power driven reciprocating carrier, of a gear mounting on the carrier constructed to permit the gear to rotate one-tooth distance at each reciprocation, means for effecting said rotations a master tooth form adapted to engage each tooth of the gear and means co-operative with the said master form to indicate a correct or an incorrect tooth.

14. In a machine to test gear teeth, the combination with a power driven reciprocating gear carrier, of a pawl adapted to engage with a tooth of the gear at each reciprocation of the carrier to rotate the gear, a master tooth form to engage with 15. In a machine to test gear teeth, the combination with a power driven carrier for a gear to be tested, of a two-part gauge, one part adapted to center the tooth and the other to gauge the tooth and both cooperating to indicate a correct or an incorrect tooth profile and means for applying the two-part gauge to the teeth.

16. In a machine to test gear teeth, the combination with a power driven reciprocating carrier for a gear to be tested of means for effecting a feed to move the gear one-tooth dimension at each reciprocation of the carrier, a two-part gauge, one part to center a tooth and the other part to gauge the tooth and both parts co-operative to indicate any error in the tooth by stopping the carrier.

17. In a machine to test gear teeth, the combination with a power driven reciprocating gear carrier, of a stop motion at each reciprocation of the carrier, and a master tooth form adapted to co-operate with a tooth during an interval when the said carrier is inactive.

18. In a machine to test gear teeth, the combination with a power driven reciprocating gear carrier, of a stop-motion for the said carrier at each reciprocation, a master tooth form and means co-operative with the said master form, to indicate any error in a tooth during one of the intervals when the said carrier remains inactive.

19. In a machine to test gear teeth, the combination with a power driven reciprocating gear carrier, of a stop motion for the carrier at the end of each reciprocation, a master tooth form and means co-operative with the said master form that indicate a correct or an incorrect tooth profile during an interval when the said carrier is inactive.

20. In a machine to test gear teeth, the combination with a gear carrier, of a driving shaft, means connecting the shaft and carrier adapted to convey an intermittent to and fro movement to the latter and a master tooth form to gauge a tooth during an interval when the carrier is inactive.

21. In a machine to test gear teeth, the combination with a reciprocating gear carrier, of a power driven shaft, a clutch connected to the shaft to control the movement of the carrier, a gauge comprising a tooth form to co-operate with a tooth of the gear at each reciprocation of the carrier and means connected to the clutch and operated by the gauge to indicate any error in the tooth's profile by rendering the clutch inoperative to move the carrier.

22. In a machine to test gear teeth, the combination with a gear carrier, of a driving element having a positive rotation, means intermediate the carrier and driving element adapted to convey an intermittent movement to the carrier and a master tooth form to gauge each tooth of the gear.

23. In a machine to test gear teeth, the combination with a gear carrier, of a two-part driving element comprising a clutch to operate the carrier, a gauge having a tooth form to gauge successively each tooth of the gear and means connected to the clutch and operated by the gauge whereby an incorrect tooth of the gear will open the clutch and stop the carrier.

24. In a machine to test gear teeth, the combination with gear carrier, of a driving element having a positive rotation, a driving shaft to operate the carrier, a clutch intermediate the shaft and driving element, a gauge comprising a tooth profile to co-operate with a tooth of the gear and means connected to the clutch and operated by the gauge whereby an incorrect tooth in the gear will arrest the carrier.

25. In a machine to test gear teeth, the combination with a gear carrier, of a driving element having a positive rotation, a shaft adapted to convey an intermittent reciprocating movement to the carrier, a clutch connecting the shaft to the driving element, a gauge comprising a tooth profile to co-operate with each tooth of the gear and means connected to the clutch and operated by the gauge whereby an incorrect tooth in the gear will stop the carrier.

26. In a machine to test gear teeth, the combination with a gear carrier, of a driving element adapted to convey a reciprocating motion to the carrier, a gauge to test individual teeth of the gear, means co-operative with the said gauge to multiply any error in the profile of the tooth and devices controlled by said means for stopping the carrier.

27. In a machine to test gear teeth, the combination with a gear carrier, of a driving shaft, a cam driven by the shaft to convey an intermittent reciprocating movement to the carrier, a gauge to test each tooth of the gear, means co-operative with the said gauge to multiply any error in the profile of a tooth and connections controlled by said means for stopping the aforesaid cam.

28. In a machine to test gear teeth, the combination with a gear carrier, a driving shaft, a cam driven by the shaft adapted to convey an intermittent reciprocating movement to the carrier, a gauge to test individual teeth of the gear, a rockshaft operated by the gauge and provided with means to multiply any error in the profile of the tooth and connections controlled by said means for stopping the aforesaid cam.

29. In a machine to test gear teeth, the combination with a power driven reciprocating carriage adapted to carry a gear, of a gauge comprising a tooth profile to engage with a tooth of the gear at each reciprocation and means operated by the gauge and connected to the carriage whereby an incorrect tooth will stop the carriage.

30. In a machine to test gear teeth, the combination with a gear carrier having a fixed stop, of a driving shaft, a cam driven by the shaft, a drawbar operated by the cam and connected to the carrier and means co-operative with the drawbar adapted to yield against the cams action after the said carrier engages its stop.

31. In a machine to test gear teeth, the combination with a gear carrier, of a driving shaft, a gauge operated by a tooth of the gear, a rock shaft controlled by the gauge comprising a short and a long arm adapted to multiply any error in the formation of the gear tooth, and means controlled by one of said arms for controlling the driving shaft.

32. In a machine to test gear teeth, the combination with a power-driven gear carrier, of two bars with gear tooth gauges adapted to be moved by the advancing tooth of the gear and means co-operative with one of the bars to control the movement of the carrier.

33. In a machine to test gear teeth, the combination with a gear carrier, of a driving shaft to operate the carrier, a gauge to test a gear tooth, and means operated by the shaft and co-operative with the gauge to register an error in the tooth.

34. A gear testing machine comprising the combination of a support for a gear to be tested, gauging devices, means for automatically effecting successive relative movements of the gear support and the gauging devices, means for automatically effecting a partial rotation of the gear between each of said relative movements, and means controlled by the gauging devices for automatically stopping the machine when the gear does not conform to the requirements of the gauging devices.

35. In a gear testing machine, the combination of gauging devices, means for automaticaly applying the gauging devices to the teeth of the gear being tested, a stop motion device, and connections whereby the gauging devices control the stop motion device.

HERBERT H. STEELE.